US012567334B2

(12) United States Patent
Bart et al.

(10) Patent No.: US 12,567,334 B2
(45) Date of Patent: Mar. 3, 2026

(54) OPTIMIZATION OF FLIGHT ROUTES FOR EMISSIONS

(71) Applicant: CHC LEASING S.A.R.L., Grand-Duchy of Luxembourg (LU)

(72) Inventors: Jacob Bart, Den Helder (NL); Ondrej Lorenz, Perth (AU); Rob Oudhuis, Den Helder (NL)

(73) Assignee: CHC LEASING S.À R.L, Grand-Duchy of Luxembourg (LU)

( * ) Notice: Subject to any disclaimer, the term of this patent is extended or adjusted under 35 U.S.C. 154(b) by 0 days.

(21) Appl. No.: 18/683,667

(22) PCT Filed: Apr. 28, 2023

(86) PCT No.: PCT/US2023/066358
§ 371 (c)(1),
(2) Date: Feb. 14, 2024

(87) PCT Pub. No.: WO2024/196421
PCT Pub. Date: Sep. 26, 2024

(65) Prior Publication Data

US 2025/0111788 A1 Apr. 3, 2025

Related U.S. Application Data

(60) Provisional application No. 63/491,905, filed on Mar. 23, 2023.

(51) Int. Cl.
*G08G 5/32* (2025.01)
*G08G 5/23* (2025.01)
(Continued)

(52) U.S. Cl.
CPC ................. *G08G 5/32* (2025.01); *G08G 5/23* (2025.01); *G08G 5/59* (2025.01); *G08G 5/76* (2025.01)

(58) Field of Classification Search
CPC .. G08G 5/32; G08G 5/23; G08G 5/59; G08G 5/76
(Continued)

(56) References Cited

U.S. PATENT DOCUMENTS 8,600,588 B2 * 12/2013 Del Amo Blanco .... G08G 5/32 701/14
9,221,548 B1 * 12/2015 Sishtla ..................... G08G 5/76
(Continued)

FOREIGN PATENT DOCUMENTS

CN 114662343 A * 6/2022 ............. G06F 30/20

OTHER PUBLICATIONS

CN114662343A.translate (Year: 2022).*
(Continued)

*Primary Examiner* — B M M Hannan
(74) *Attorney, Agent, or Firm* — DLA Piper LLP US

(57) ABSTRACT

Systems and methods for optimizing energy usage and/or emissions for a given flight by providing an optimum profile for an aerial vehicle. The systems can utilize weather data and a performance model of the aerial vehicle to calculate energy usage by the aerial vehicle at various altitudes and speeds along the flight route. The systems can further determine the optimal altitude and speed profile along the flight route for the aerial vehicle, which defines the altitudes along the flight route that result in the minimum energy usage for the aerial vehicle. The systems can further provide reports to users.

14 Claims, 5 Drawing Sheets

(51) Int. Cl.
*G08G 5/59* (2025.01)
*G08G 5/76* (2025.01)

(58) Field of Classification Search
USPC .......................................................... 701/123
See application file for complete search history.

(56) References Cited

U.S. PATENT DOCUMENTS 10,388,169 B2* 8/2019 Agrawal .................. G08G 5/22
11,829,358 B2* 11/2023 Kar ................... G06F 16/24522
2008/0250423 A1* 10/2008 Bush .................. H04B 7/18506 701/423
2009/0204453 A1 8/2009 Cooper et al.
2013/0006512 A1* 1/2013 Saggio, III ............... G08G 5/26 701/120
2014/0028476 A1* 1/2014 Kolbe ...................... G08G 5/74 340/971
2014/0081569 A1 3/2014 Agrawal et al.
2014/0120961 A1* 5/2014 Buck ........................ G06F 1/329 455/466
2016/0085239 A1* 3/2016 Boyer .................... G05D 1/042 701/5
2016/0140853 A1 5/2016 Smith
2017/0227955 A1* 8/2017 Krupansky .............. G08G 5/21
2018/0003506 A1* 1/2018 Ghaemi .................... G06F 7/64
2019/0317489 A1* 10/2019 Hansman ............. B64D 37/005
2020/0168106 A1* 5/2020 De Prins .................. G08G 5/30
2020/0290742 A1* 9/2020 Kumar ................... B64D 27/10
2020/0355519 A1* 11/2020 Shamasundar .......... G08G 5/55
2022/0028287 A1* 1/2022 Durant ................. G06Q 10/047
2022/0148441 A1 5/2022 Klüssendorf et al.
2022/0267014 A1* 8/2022 Wang ..................... B64D 15/20
2024/0385627 A1* 11/2024 Pradeep ................... G08G 5/21

OTHER PUBLICATIONS

International Search Report and Written Opinion of the International Searching Authority issued in International Application No. PCT/US2023/066358, 14 pages, dated Aug. 23, 2023.

* cited by examiner

| Flight Number | Depart | Dest | Prev Leg | Prev Alt | Next Alt | Next Leg | Sector | Rules | Icing Clearance | Single Level | Ignore Sem Cir |
|---|---|---|---|---|---|---|---|---|---|---|---|
| DH98A | A12 | EHKD | << | < | > | >> | 1 of 1 | IFR | ✓ | ✓ | ✓ |

Via BENUX-> BESBU-> BOGTI-> BIBIS-> BAGOV-> AMSOT-> ATRIX-> HDR A12 - EHKD Distance 157 NM

| QNH 996 | Fuel Burn | Wind | Temp | IAS | TAS | GS | ETE | |
|---|---|---|---|---|---|---|---|---|
| FL100 | 530 | 240/38 | -10 | 123 | 144 | 120 | 1:18 | Select |
| FL90 | 527 | 239/37 | -8 | 125 | 144 | 122 | 1:16 | SELECTED |
| FL80 | 523 | 239/36 | -6 | 128 | 145 | 123 | 1:16 | Select |
| FL70 | 546 | 239/35 | -4 | 130 | 145 | 119 | 1:18 | Select |
| FL60 | 547 | 241/33 | -2 | 124 | 136 | 120 | 1:17 | Select |
| FL50 | 545 | 241/33 | -1 | 127 | 137 | 120 | 1:18 | Select |
| FL40 | 562 | 241/34 | 1 | 138 | 147 | 122 | 1:16 | Select |
| 3000 | 576 | 239/36 | 4 | 140 | 147 | 126 | 1:14 | Select |
| 2000 | 587 | 236/37 | 6 | 142 | 147 | 124 | 1:15 | Select |
| 500 | | | | | | | | |

OPTIMIZATION OF FLIGHT ROUTES FOR EMISSIONS

PRIORITY

The present application is a 371 of International Application No. PCT/US2023/066358, filed Apr. 28, 2023, which claims priority to U.S. Provisional Application No. 63/491,905, titled FLIGHT PLANNING SOFTWARE, filed Mar. 23, 2023, which are hereby incorporated by reference herein in their entireties.

BACKGROUND

Society is increasingly becoming concerned with the environmental impacts from emissions, such as $CO_2$, nitrogen (NOx), and particulate matter (PM). Many industries, such as the automobile industry, are shifting towards battery technology in an effort to reduce emissions caused by conventional combustion engines. However, battery technology has not advanced to the point where an all-electric helicopter or other aerial vehicle is feasible. Therefore, alternative solutions must be identified in order to allow the aviation industry to minimize its environmental impact. Accordingly, there is a need in the art for systems and methods to optimize flight profiles for helicopters and other air vehicles to minimize or reduce emissions (e.g., $CO_2$, NOx, and PM), particularly by minimizing or reducing energy usage by the air vehicles. Additionally, minimizing or reducing energy usage by identifying the most energy efficient flight profiles can also be useful in the event that the aviation industry switches from fossil fuels to alternative fuels or electric batteries because it would reduce energy storage capacity requirements for the air vehicles.

SUMMARY

The present disclosure is directed to aviation (in particular, commercial helicopter operations) and software (i.e., helicopter flight planning). Disclosed herein are systems and processes for optimizing routes for air vehicles for emissions (e.g., $CO_2$).

In one embodiment, there is provided a method for optimizing energy usage for a flight by providing an optimum profile for an aerial vehicle, the method comprising: receiving a flight route for the aerial vehicle; retrieving, from a database, weather data corresponding to the flight route, wherein the weather data comprises icing data and windspeed data; retrieving from a database a performance model of the air vehicle; determining, based on the icing data, a maximum altitude for the aerial vehicle; determining weather data for each of a plurality of altitudes along the flight route up to the maximum altitude; calculating an energy usage by the aerial vehicle for each of the plurality of altitudes and a plurality of air vehicle speeds based on the weather data and a physical parameter of the aerial vehicle; determining which combination of the plurality of altitudes and the plurality of aerial vehicle speeds result in a minimum energy usage by the aerial vehicle based on the calculated energy usage for each of the plurality of altitudes and aerial vehicle speeds; determining the optimal altitude and speed profile along the flight route for the aerial vehicle, wherein the optimal altitude and speed profile defines the plurality of altitudes along the flight route that result in the minimum energy usage for the aerial vehicle; and providing a report identifying the optimal altitude and speed profile.

In one embodiment, there is provided a system for optimizing energy usage for a flight by providing an optimum profile for an aerial vehicle, the system comprising: a graphical user interface; and a computer system communicably coupled to the graphical user interface, the computer system comprising a processor and a memory, the memory storing instructions that, when executed by the processor, cause the computer system to: receive a flight route for the aerial vehicle; retrieve, from a database, weather data corresponding to the flight route, wherein the weather data comprises icing data and windspeed data; retrieve, from the database, a performance model of the air vehicle; determine, based on the icing data, a maximum altitude for the aerial vehicle; determine weather data for each of a plurality of altitudes along the flight route up to the maximum altitude; calculate an energy usage by the aerial vehicle for each of the plurality of altitudes and a plurality of air vehicle speeds based on the weather data and a physical parameter of the aerial vehicle; determine which combination of the plurality of altitudes and the plurality of aerial vehicle speeds result in a minimum energy usage by the aerial vehicle based on the calculated energy usage for each of the plurality of altitudes and aerial vehicle speeds; determine the optimal altitude and speed profile along the flight route for the aerial vehicle, wherein the optimal altitude and speed profile defines the plurality of altitudes along the flight route that result in the minimum energy usage for the aerial vehicle; and provide a report identifying the optimal altitude and speed profile.

In some embodiments of the method and system, the aerial vehicle comprises a helicopter.

In some embodiments of the method and system, the physical parameter of the aerial vehicle comprises a mass of the aerial vehicle.

In some embodiments of the method and system, wherein the mass of the aerial vehicle comprises a payload carried by the aerial vehicle.

In some embodiments of the method and system, calculating the energy usage by the aerial vehicle further comprises: calculating the energy usage for the aerial vehicle during a climb portion of the flight route; calculating the energy usage for the aerial vehicle during a cruising portion of the flight route, the cruising portion comprising the plurality of altitudes and speeds; and calculating the energy usage for the aerial vehicle during a descent portion of the flight route.

In some embodiments of the method and system, the report is presented via a graphical user interface.

In some embodiments of the method and system, determining the optimal altitude and speed profile further complies with local restrictions or airspace rules on speed or altitude by the aerial vehicle.

In some embodiments of the method and system, the report further comprises a difference between the energy usage by the aerial vehicle according to the optimal altitude and speed profile and the energy usage by the aerial vehicle according to a default altitude and speed profile for the flight route.

FIGURES

DETAILED DESCRIPTION

The present disclosure is generally directed to systems and methods for optimizing flight routes for aerial vehicles, such as helicopters, in order to minimize emissions. Society is increasingly becoming concerned with the environmental impacts from emissions, such as $CO_2$, NOx, and PM. Many industries, such as the automobile industry, are shifting towards battery technology in an effort to reduce emissions caused by conventional combustion engines. However, battery technology has not advanced to the point where an all-electric helicopter or other aerial vehicle is feasible. Therefore, alternative solutions must be identified in order to allow the aviation industry to minimize its environmental impact. The solution described herein is to optimize aerial vehicles' flights profiles based on weather conditions and the aerial vehicles' performance parameters to minimize the amount of fuel burned by the aerial vehicle, which in turn minimizes the amounts of emissions produced by the aerial vehicle in flying its route.

Some embodiments are described herein in the context of helicopters. Helicopter flights are traditionally flown at a fixed altitude and a fixed speed. However, helicopters generally become more efficient when flown at altitude due to there being less drag and other environmental factors. Helicopter performance can be represented as a power curve, which maps the relationship between airspeed to power. A helicopter's power curve can be used to determine an optimum speed at which the helicopter should be flown given the particular flight route and current environmental factors in order to minimize the amount of fuel used by the helicopter.

The present flight optimization system can aid pilots in selecting the optimum altitude and speed for a given flight route. In operation, a pilot can enter some information into the flight optimization system (e.g., the flight route and the aerial vehicle's payload) and, combined with weather data (e.g. wind speeds and temperature at each altitude, the flight optimization system can then calculate the amount of fuel used at multiple different altitudes and air speeds. The flight optimization system can accordingly determine an optimum airspeed and flight altitude that produces the fewest emissions, which can then be reported to the pilot.

Flight Optimization System

Figure 1:
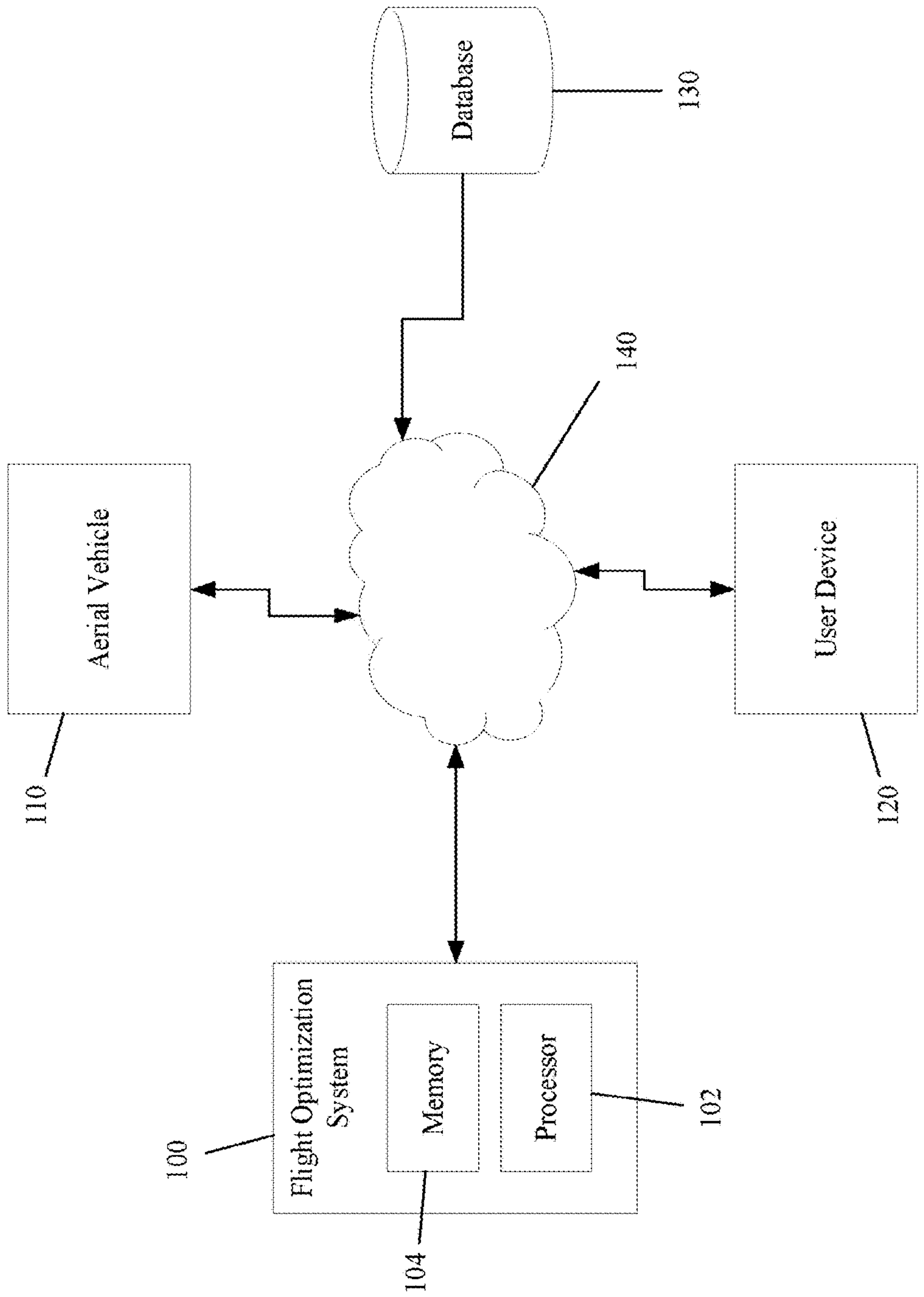
FIG. 1 depicts a block diagram of a flight optimization system, in accordance with an embodiment of the present disclosure.

As generally described above, the present disclosure is directed to a system 100 operable to optimize a flight plan for an aerial vehicle 110, as shown in FIG. 1. In some embodiments, the flight optimization system 100 can be operable to optimize the flight route of an aerial vehicle 110 with respect to various emissions parameters, such as $CO_2$ emissions. The aerial vehicle 110 can include a helicopter or a fixed wing aircraft. In one embodiment, the flight optimization system 100 can receive a flight route for the aerial vehicle 110 from a user device 120 (e.g., a mobile device, laptop, or desktop computer), retrieve data (e.g., weather data) corresponding to the particular flight route from a database 130, and optimize various flight parameters of the route (e.g., altitude). The flight optimization system 100 can be embodied as a computer system comprising a processor 102 coupled to a memory 104, for example. In one embodiment, the flight optimization system 100 can provide a report delineating the proposed optimized route to the user via the user device 120. In another embodiment, the flight optimization system 100 can upload the optimized flight route to the aerial vehicle 110. The flight optimization system 100 can be accessed via a website, an app, a web portal, and other such clients executable on the user device 120. In one embodiment, the aerial vehicle 110, user device 120, and/or database 130 can be communicably coupled to the flight optimization system 100 via a network 140 (e.g., the Internet).

The database 130 that the flight optimization system 100 is communicably coupled to can store a variety of different data that can be utilized by the flight optimization system 100 for optimizing a flight route. In some embodiments, the database 130 can include a third-party database that the flight optimization system 100 is able to draw data from (e.g., via an application programming interface). In one embodiment, the database 130 can store weather data, such as windspeed, temperature, pressure (e.g., mean sea level), icing severity, and/or freezing altitude (i.e., the altitude at which ice may form on rotor blades or airplane wings). In this embodiment, the database 130 can include the NOAA Global Forecast System (GFS) model. The NOAA GFS model can be particularly advantageous for use in aviation systems because of its highly accurate oceanic weather modeling.

Figure 3A:
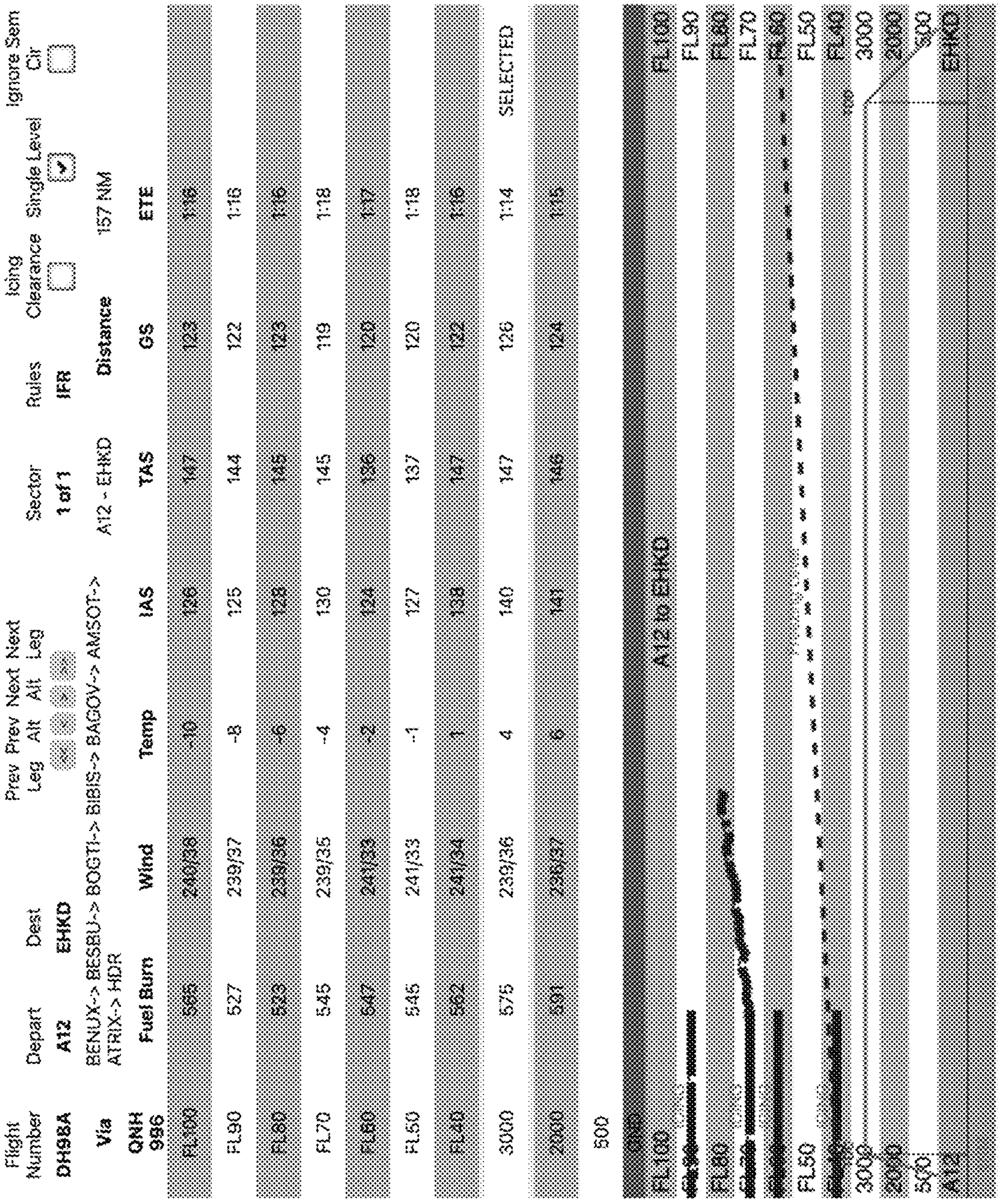
FIG. 3A depicts a first graphical report providing an illustrative optimal flight profile, in accordance with an embodiment of the present disclosure.
Figure 3B:
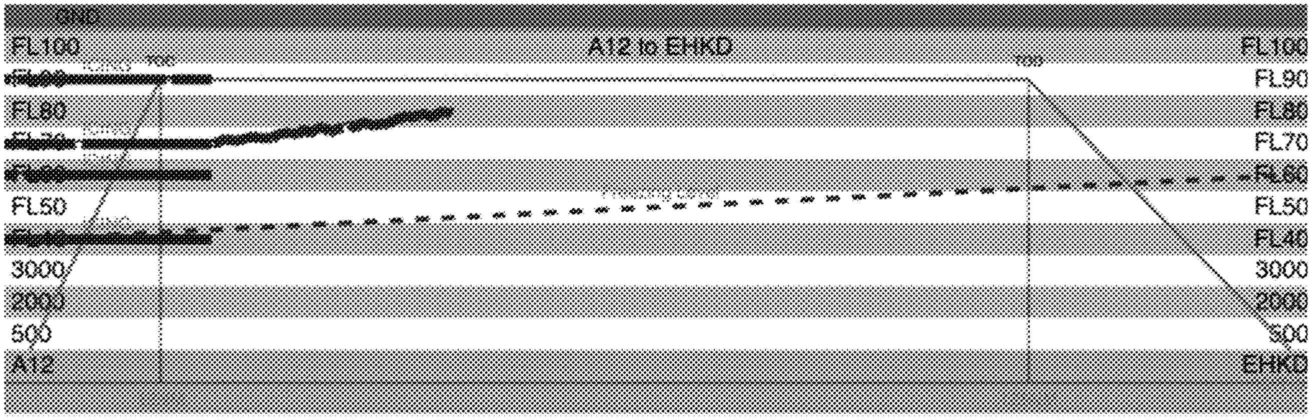
FIG. 3B depicts a second graphical report providing an illustrative optimal flight profile, in accordance with an embodiment of the present disclosure.
Figure 3C:
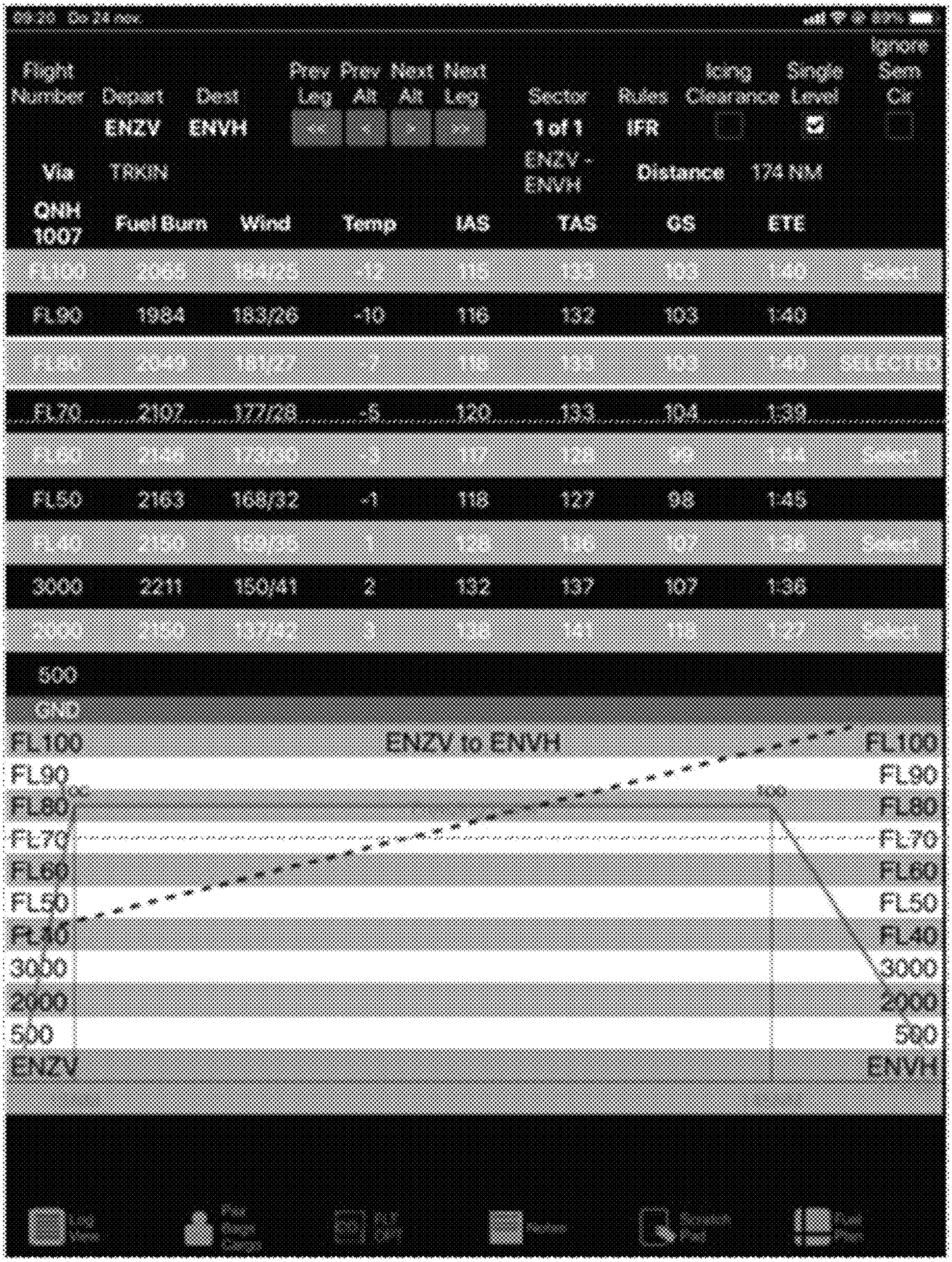
FIG. 3C depicts a third graphical report providing an illustrative optimal flight profile, in accordance with an embodiment of the present disclosure.

The flight optimization system 100 can be programmed to provide a graphical user interface (GUI) through which users can input data to the flight optimization system 100, view reports generated by the flight optimization system 100, or otherwise interact with the flight optimization system 100. In some embodiments, the GUI can be provided via a smartphone app downloaded to the user device 120, a web application, a website, and so on. Various implementations of the GUI are shown in FIGS. 3A-3C and described in greater detail below. In one embodiment, the flight optimization system 100 can additionally be programmed to transmit reports to the user via, for example, email or text message. For example, a pilot can enter a planned flight route via the GUI that is, accordingly, received by the flight optimization system 100. Upon receipt of the planned flight route, the flight optimization system 100 can then query the database 130 to retrieve the necessary data (e.g., weather data) to optimize the planned flight route for emissions and report the same to the user. In these examples, "QNH" is the air pressure at sea level. This can be used by the flight optimization system 100 to calculate the pressure at a given altitude, which determines the performance of the aerial vehicle 110. "IAS" is the indicated airspeed, which is what the pilots see on the airspeed indicator and, hence, what the flight optimization system 100 informs the pilots to fly at. "TAS" is the true airspeed, which depends on the air density and is normally higher than the IAS at height. The TAS is what the aerial vehicle 110 effectively experiences as its airspeed and what determines the performance of the aerial vehicle 110. "GS" is the groundspeed, which is a combination of the TAS and the tail- or headwind (i.e., how fast the air vehicle moves relative to the ground). "ETE" is the estimated time en route. "FL" is the flight level. At a certain altitude, the pilot switches the altimeter setting from QNH to QNE (which is a standard altimeter setting). At this altitude, the pilot is to refer to the altitude as flight level to avoid confusion with air traffic control. Because all aircraft use the same setting, they can thus avoid mid-air collisions.

In one embodiment, the database 130 can additionally store information on various aircraft models, including weight, size, fuel consumption, and other parameters. This aircraft model data can be used by the flight optimization system 100 in its flight profile planning algorithm(s), as described below.

Processes for Flight Route Optimization

As generally outlined above, the flight optimization system 100 can execute various processes for optimizing emissions by aerial vehicles 110 via minimizing fuel consumption. Notably, the flight optimization system 100 does not plan flight routes; rather, it optimizes a given flight route to define an optimal flight profile for that flight route based on current weather conditions, payload, aerial vehicle model, and so on. In general, it is beneficial to optimize flight profiles as compared to flight routes because changing a route to add additional waypoints as compared to the shortest possible route would increase the length of the flight, to the detriment of passengers. Further, any additional waypoints would increase the track miles and, accordingly, the emissions produced by the aerial vehicles 110.

Figure 2:
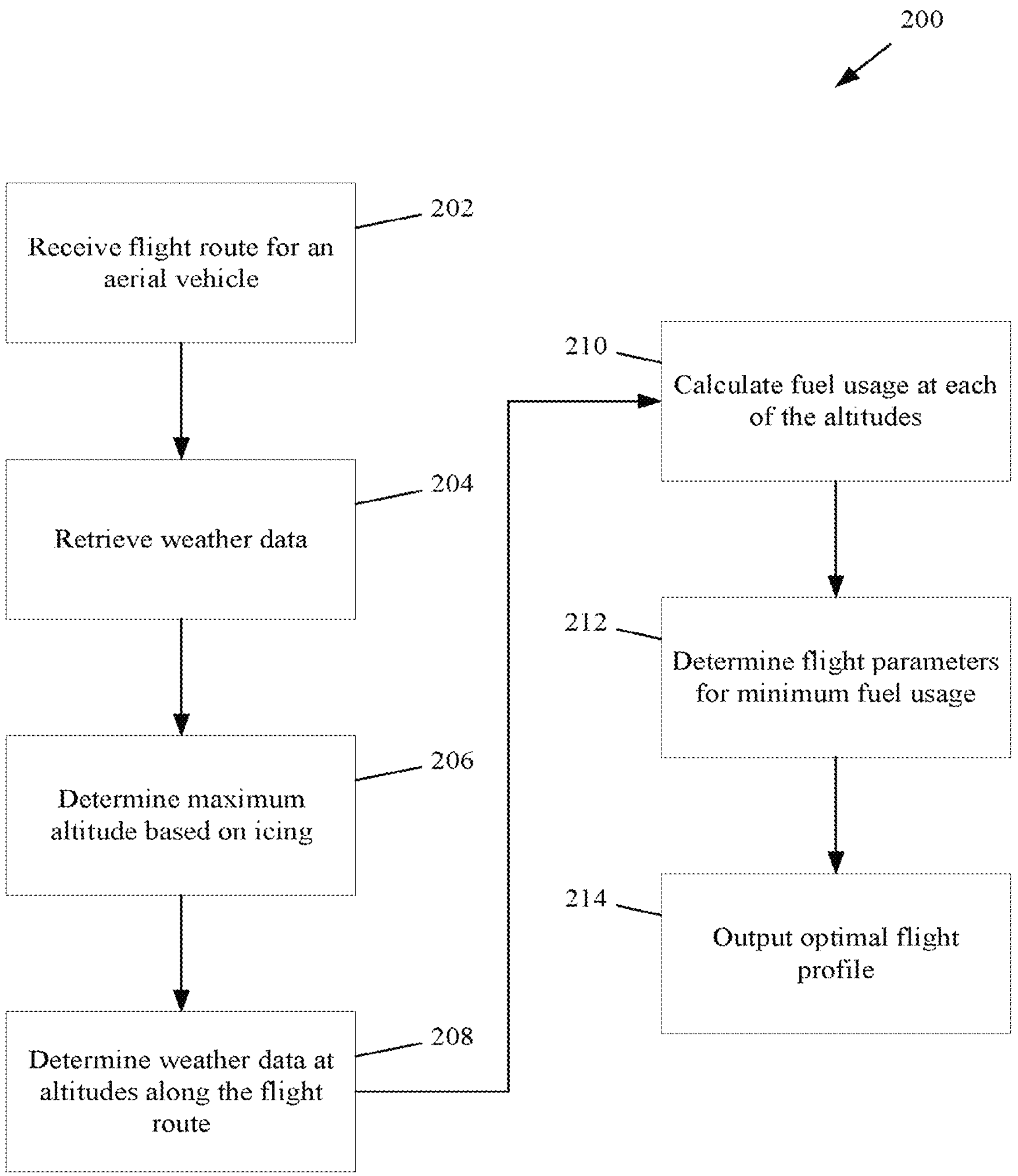
FIG. 2 depicts a flow diagram of a process for optimizing a flight route, in accordance with an embodiment of the present disclosure.

One embodiment of a process 200 for optimizing the flight route of an aerial vehicle is shown in FIG. 2. In one embodiment, the process 200 can be embodied as instructions stored in a memory (e.g., the memory 104) that, when executed by a processor (e.g., the processor 102), cause the flight optimization system 100 to perform the process 200. In various embodiments, the process 200 can be embodied as software, hardware, firmware, and various combinations thereof. In various embodiments, the process 200 can be executed by and/or between a variety of different devices or systems. For example, various combinations of steps of the process 200 can be executed by the flight optimization system 100, the database 130, the network 140, and/or the user device 120. In various embodiments, the flight optimization system 100 can execute the process 200 utilizing distributed processing, parallel processing, cloud processing, and/or edge computing techniques. For brevity, the process 200 is described below as being executed by the flight optimization system 100; however, it should be understood that the functions can be individually or collectively executed by the flight optimization system 100 and/or one or multiple other devices or systems that are communicably coupled to the flight optimization system 100.

Accordingly, the flight optimization system 100 can receive a flight route 202 for the aerial vehicle 110. The flight route can include an origin, a destination, and can define a path therebetween. In some embodiments, the flight route can be defined in latitudinal and longitudinal coordinates. In one embodiment, the flight route can be entered by a user (e.g., a pilot) via his or her user device 120. In another embodiment, the flight optimization system 100 can automatically retrieve the flight route from the aerial vehicle 110, the user device 120, and/or another device or system.

The flight optimization system 100 further can retrieve weather data 204 from the database 130 corresponding to the received flight route. As noted above, the database 130 can include the NOAA GFS mode or other third-party weather model databases. The retrieved weather data can include, for example, windspeed, temperature, pressure (e.g., mean sea level), icing severity, and/or freezing altitude. The flight optimization system 100 can utilize the retrieved weather data in a variety of different ways, including using the weather data to calculate the maximum allowable (i.e., safe) altitude at which the aerial vehicle 110 can operate (which in turn establishes an upper limit on the altitudes that the flight optimization system 100 needs to consider for fuel efficiency purposes) and calculating the expected fuel usage by the aerial vehicle 110 based on the current weather conditions so that the most energy-efficient flight profile can be created.

Accordingly, the flight optimization system 100 can determine 206 the maximum flight altitude for the aerial vehicle 110 based on the icing data retrieved from the database 130. In one embodiment, the flight optimization system 100 can set the maximum flight altitude at the icing altitude minus a preset distance (e.g., 500 ft). For example, if the icing altitude for the particular weather conditions was 3,000 ft, the flight optimization system 100 can set the maximum flight altitude at 2,500 ft. In one embodiment, the flight optimization system 100 can utilize a performance model for the aerial vehicle 110 to determine 206 the maximum flight altitude. The aerial vehicle performance model can include the icing capabilities of the aerial vehicle 110. Accordingly, the aerial vehicle performance model can be utilized by the flight optimization system 100 in combination with a weather model that reports the icing severity at each altitude to allow the flight optimization system 100 to calculate the effects of icing on the aerial vehicle 110 (including accounting for the energy usage by the aerial vehicle 110 due to the icing) up to the maximum limit for the aerial vehicle 110.

Further, the flight optimization system 100 can determine and/or calculate the expected energy usage for the aerial vehicle 110 at various altitudes up to the determined maximum flight altitude. In one embodiment, the flight optimization system 100 can calculate expected energy usage at preset step sizes with respect to the maximum flight altitude. For example, if the maximum flight altitude was determined to be 2,500 ft and the altitude step size was set to 500 ft, the flight optimization system 100 can calculate fuel usage for the aerial vehicle 110 at 2,500 ft, 2,000 ft, 1,500 ft, and so on. The calculation for the expected energy usage for an aerial vehicle 110 can be based on a variety of different factors, including the type of aerial vehicle 110 (e.g., helicopter), windspeeds (which can vary based on the altitude), the mass of the aerial vehicle 110, and so on.

Accordingly, the flight optimization system 100 can determine 208 the weather data (e.g., windspeed, temperature, and whether icing is present) at multiple altitudes along the flight route up to the determined maximum flight altitude based on the weather data retrieved from the database 130. Further, the flight optimization system 100 can calculate 210 the expected fuel usage by the aerial vehicle 110 at each of the altitudes based on the weather data (e.g., windspeed, temperature, and whether icing is present) and a performance model of the aerial vehicle 110 (which can include, e.g., mass and other physical parameters of the aerial vehicle 110. For helicopters, manufacturers generally provide a power curve for the helicopter model from which the expected fuel usage can be calculated. Therefore, in one embodiment, the flight optimization system 100 can calculate the expected fuel usage from the helicopter model's power curve. The flight optimization system 100 can determine the fuel usage by the aerial vehicle 110 at multiple altitudes so that the different latitudes can be compared to determine which altitude would be most efficient for the aerial vehicle 110 to operate at.

In one embodiment, the multiple altitudes that the flight optimization system 100 calculates 210 the energy usage for can correspond to the cruising altitude for the aerial vehicle i110. However, the flight route naturally includes climb and descent portions that correspond to the cruising altitude. In other words, the higher the cruising altitude for the aerial vehicle 110, the longer the climb and descent will be, which can in turn affect the energy consumption by the aerial vehicle 110. Therefore, depending on the weather conditions, it may not necessarily be most fuel efficient for the aerial vehicle 110 to climb to the highest allowable cruising altitude, despite the fact that aerial vehicles 110 tend to be more energy efficient at higher altitudes (e.g., due to less air resistance). In one embodiment, the flight optimization system 100 can further calculate the expected energy usage for the aerial vehicle during the climb portion and the descent portion of the flight route, in addition to calculating the expected energy usage during the cruising portion of the flight route. Energy usage for different aerial vehicle models climbing to and/or descending from different altitudes is not readily available from public data sources. Therefore, in one embodiment, the flight optimization system 100 can be programmed to receive flight data monitoring (FDM) data from previous flights. The historical FDM data can be utilized by the flight optimization system 100 to calculate the expected fuel usage for the climb and descent of the aerial vehicle 110 given the model, altitude, and weather conditions. In one embodiment, the flight optimization system 100 can further take into account weight changes throughout the course of the flight route (e.g., due to fuel consumption) in calculating 210 the energy usage by the aerial vehicle 110. Notably, as the aerial vehicle 110 becomes lighter, the optimum altitude and speed may change. Accordingly, the flight optimization system 100 can calculate changeover points and provide flight routes that inform the pilot to climb or descend and change speed as required to optimize energy usage.

Accordingly, the flight optimization system 100 can determine 212 which of the analyzed cruising altitudes and other flight parameters (e.g., airspeed of the aerial vehicle 110) result in the minimal energy usage and, thus, provide the optimal flight profile for the aerial vehicle 110 from an emissions perspective. The flight optimization system 100 can then output 214 the determined optimal flight profile to the user (e.g., a pilot). In various embodiments, the optimal flight profile report can be provided graphically (e.g., via a GUI), be transmitted to the user (e.g., via email), and/or transmitted to the aerial vehicle 110. In one embodiment, the output 214 can further include a difference in energy usage between the determined optimal flight profile and the energy that would have been used by the aerial vehicle 110 based on a standard or default flight profile for the given route. Accordingly, the flight optimization system 100 can report the amount of emissions (e.g., $CO_2$) saved by using the determined optimal flight profile.

In some embodiments, the flight optimization system 100 can further take into account various external considerations or constraints in determining 212 the optimal flight profile. For example, the flight optimization system 100 could account for flight altitude restrictions for particular routes to prevent mid-air collisions. As another example, the flight optimization system 100 could account for altitude restrictions based on local law and/or regulation.

Some examples of graphical reports that can be output by the flight optimization system 100 are shown in FIGS. 3A-3C. In particular, FIG. 3A illustrates a graphical flight profile report for an AW139 helicopter indicating that icing conditions dictate that the helicopter cannot be sent above 3,000 ft because it is unsafe to fly above that altitude. FIG. 3B illustrates a graphical flight profile report for an AW139 with an icing clearance indicating that the optimum altitude is higher if flight through icing is allowed. Further, FIG. 3C illustrates a graphic flight profile report for an S92A helicopter indicating that the optimal flight profile within the rules of the air is FL80, even though FL090 would be more efficient, the semi-circular rule does not allow the flight to be conducted at FL090 because, in this instance, local air rules require that this particular track be flown at an even level in order to avoid mid-air collisions. As noted above, the flight optimization system 100 will not output or recommend flight profiles that would not comply with local law and/or regulation.

In one embodiment, the flight optimization system 100 can further allow users to input one or more waypoints, altitude restrictions, or other constraints on the flight route profile. For example, the flight optimization system 100 could allow users to add a waypoint to a particular location between the origin and the destination of the flight route. Accordingly, the flight optimization system 100 could calculate the expected fuel usage by the aerial vehicle 110 for each leg of the flight route (e.g., from the origin to the waypoint and from the waypoint to the destination) at different altitudes based on the weather data and other parameters described above. Further, the legs of the flight route could be at different altitudes. Therefore, the flight optimization system 100 could further be programmed to incorporate climb and descent calculations between the legs of the flight route into the overall flight route optimization calculation. In one embodiment, the flight optimization system 100 could further incorporate various additional factors (e.g., country-based altitude limitations) to ensure that the optimized flight profiles comply with local regulations and other external factors.

The flight optimization system 100 and various flight route optimization techniques described herein are highly beneficial because they minimize energy consumption by aerial vehicles 110, which in turn minimizes the amount of emissions generated thereby. By minimizing emissions, the flight optimization system 100 can meet consumer demand for cleaner, more environmentally friendly aviation.

This disclosure is not limited to the particular systems, devices and methods described, as these may vary. The terminology used in the description is for the purpose of describing the particular versions or embodiments only and is not intended to limit the scope of the disclosure.

The following terms shall have, for the purposes of this application, the respective meanings set forth below. Unless otherwise defined, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a," "an," and "the" include plural references, unless the context clearly dictates otherwise. Thus, for example, reference to a "protein" is a reference to one or more proteins and equivalents thereof known to those skilled in the art, and so forth.

As used herein, the term "about" means plus or minus 10% of the numerical value of the number with which it is being used. Therefore, about 50 mm means in the range of 45 mm to 55 mm.

As used herein, the term "consists of" or "consisting of" means that the device or method includes only the elements, steps, or ingredients specifically recited in the particular claimed embodiment or claim.

In embodiments or claims where the term "comprising" is used as the transition phrase, such embodiments can also be envisioned with replacement of the term "comprising" with the terms "consisting of" or "consisting essentially of."

While the present disclosure has been illustrated by the description of exemplary embodiments thereof, and while the embodiments have been described in certain detail, it is not the intention of the Applicants to restrict or in any way limit the scope of the appended claims to such detail. Additional advantages and modifications will readily appear to those skilled in the art. Therefore, the disclosure in its broader aspects is not limited to any of the specific details, representative devices and methods, and/or illustrative examples shown and described. Accordingly, departures may be made from such details without departing from the spirit or scope of the Applicant's general inventive concept.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method for optimizing energy usage for a flight by providing an optimum profile for an aerial vehicle, the method comprising:

receiving a flight route for the aerial vehicle via a user manipulating a graphical user interface (GUI) to input the flight route;

retrieving, by querying a database via an application programming interface (API), weather data corresponding to the flight route, wherein the weather data comprises icing data and windspeed data;

retrieving from a database a performance model of the air vehicle;

determining, based on the icing data, a maximum altitude for the aerial vehicle;

determining the weather data for each of a plurality of altitudes along the flight route up to the maximum altitude;

calculating an energy usage by the aerial vehicle for each of the plurality of altitudes and a plurality of air vehicle speeds based on the weather data and a physical parameter of the aerial vehicle by:

calculating the energy usage for the aerial vehicle during a climb portion of the flight route, calculating the energy usage for the aerial vehicle during a cruising portion of the flight route, the cruising portion comprising the plurality of altitudes and speeds, and calculating the energy usage for the aerial vehicle during a descent portion of the flight route;

determining which combination of the plurality of altitudes and the plurality of aerial vehicle speeds result in a minimum energy usage by the aerial vehicle based on the calculated energy usage for each of the plurality of altitudes and aerial vehicle speeds;

determining an optimal altitude and speed profile along the flight route for the aerial vehicle, wherein the optimal altitude and speed profile defines the plurality of altitudes along the flight route that result in the minimum energy usage for the aerial vehicle; and providing a report that is displayed on the GUI identifying the optimal altitude and the speed profile.

2. The method of claim 1, wherein the aerial vehicle comprises a helicopter.

3. The method of claim 1, wherein the physical parameter of the aerial vehicle comprises a mass of the aerial vehicle.

4. The method of claim 3, wherein the mass of the aerial vehicle comprises a payload carried by the aerial vehicle.

5. The method of claim 1, wherein the report is presented via a graphical user interface.

6. The method of claim 1, wherein determining the optimal altitude and the speed profile further complies with local restrictions or airspace rules on speed or altitude by the aerial vehicle.

7. The method of claim 1, wherein the report further comprises a difference between the energy usage by the aerial vehicle according to the optimal altitude and the speed profile and the energy usage by the aerial vehicle according to a default altitude and the speed profile for the flight route.

8. A system for optimizing energy usage for a flight by providing an optimum profile for an aerial vehicle, the system comprising:

a graphical user interface; and a computer system communicably coupled to the graphical user interface, the computer system comprising a processor and a memory, the memory storing instructions that, when executed by the processor, cause the computer system to:

receive a flight route for the aerial vehicle via a user manipulating a graphical user interface (GUI) to input the flight route;

retrieve, from a database, weather data corresponding to the flight route, wherein the weather data comprises icing data and windspeed data;

retrieve, from the database, a performance model of the air vehicle;

determine, based on the icing data, a maximum altitude for the aerial vehicle;

determine the weather data for each of a plurality of altitudes along the flight route up to the maximum altitude;

calculate an energy usage by the aerial vehicle for each of the plurality of altitudes and a plurality of air vehicle speeds based on the weather data and a physical parameter of the aerial vehicle by:

calculating the energy usage for the aerial vehicle during a climb portion of the flight route, calculating the energy usage for the aerial vehicle during a cruising portion of the flight route, the cruising portion comprising the plurality of altitudes and speeds, and calculating the energy usage for the aerial vehicle during a descent portion of the flight route;

determine which combination of the plurality of altitudes and the plurality of aerial vehicle speeds result in a minimum energy usage by the aerial vehicle based on the calculated energy usage for each of the plurality of altitudes and aerial vehicle speeds;

determine an optimal altitude and speed profile along the flight route for the aerial vehicle, wherein the optimal altitude and speed profile defines the plurality of altitudes along the flight route that result in the minimum energy usage for the aerial vehicle;

provide a report identifying the optimal altitude and the speed profile;

receive, via the user manipulating the GUI, an additional input comprising at least one waypoint, altitude restriction, or constraint on the flight route;

determine an additional optimal altitude and the speed profile along the flight route for the aerial vehicle; and provide an additional report identifying the additional optimal altitude and the speed profile.

9. The system of claim 8, wherein the aerial vehicle comprises a helicopter.

10. The system of claim 8, wherein the physical parameter of the aerial vehicle comprises a mass of the aerial vehicle.

11. The system of claim 10, wherein the mass of the aerial vehicle comprises a payload carried by the aerial vehicle.

12. The system of claim 8, wherein the report is presented via a graphical user interface.

13. The system of claim 8, wherein the computer system determines the optimal altitude and the speed profile in compliance with local restrictions or airspace rules on speed or altitude by the aerial vehicle.

14. The system of claim 8, wherein the report further comprises a difference between the energy usage by the aerial vehicle according to the optimal altitude and the speed profile and the energy usage by the aerial vehicle according to a default altitude and speed profile for the flight route.

* * * * *